United States Patent [19]

Prucher

[11] Patent Number: 5,349,153
[45] Date of Patent: Sep. 20, 1994

[54] SPOT WELDING ELECTRODE AND METHOD FOR WELDING COATED METALS THEREWITH

[76] Inventor: Bryan Prucher, 32 N. Main, Clarkston, Mich. 48016

[21] Appl. No.: 952,051

[22] Filed: Sep. 28, 1992

[51] Int. Cl.$^5$ .................... B23K 11/11; B23K 11/30
[52] U.S. Cl. ................................. 219/120; 219/117.1
[58] Field of Search ............... 219/119, 120, 86.31, 219/117.1, 91.2, 110

[56] References Cited

U.S. PATENT DOCUMENTS

| | | | |
|---|---|---|---|
| 4,476,372 | 10/1984 | Prucher | 219/120 |
| 4,588,870 | 5/1986 | Nadkarni et al. | 219/119 |
| 4,678,887 | 7/1987 | Nagel et al. | 219/117.1 |
| 4,728,765 | 3/1988 | Prucher | 219/120 |
| 4,734,555 | 3/1988 | Ferguson | 219/110 |
| 4,760,235 | 7/1988 | Flater | 219/119 |

FOREIGN PATENT DOCUMENTS

| | | | |
|---|---|---|---|
| 62-3885 | 1/1987 | Japan | 219/119 |
| 1118503 | 10/1984 | U.S.S.R. | 219/120 |

*Primary Examiner*—Geoffrey S. Evans
*Attorney, Agent, or Firm*—Weintraub, DuRoss & Brady

[57] ABSTRACT

A spot welding electrode designed for welding coated metals such as galvanized steel and a method of welding coated metals using the spot welding electrode. The electrode includes a housing having a hollow cavity with an open end and a closed end. The cavity is surrounded by a cooling wall which has an outer surface and a parallel inner surface. The parallel surfaces provide a substantially improved and consistent cooling method for maintaining temperature at the electrode-workpiece interface below the melting point of the coating. The bulk of the heating during the weld cycle is focused at the interface of the workpiece.

12 Claims, 2 Drawing Sheets

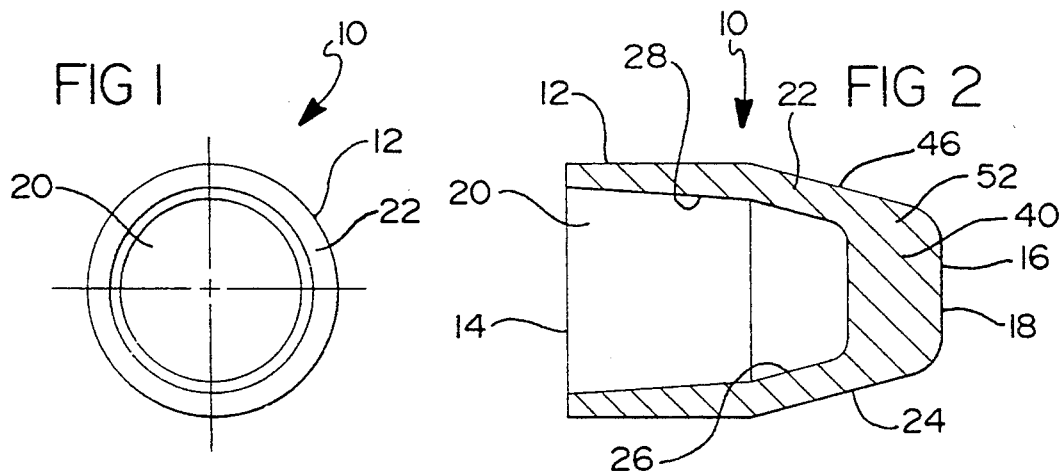
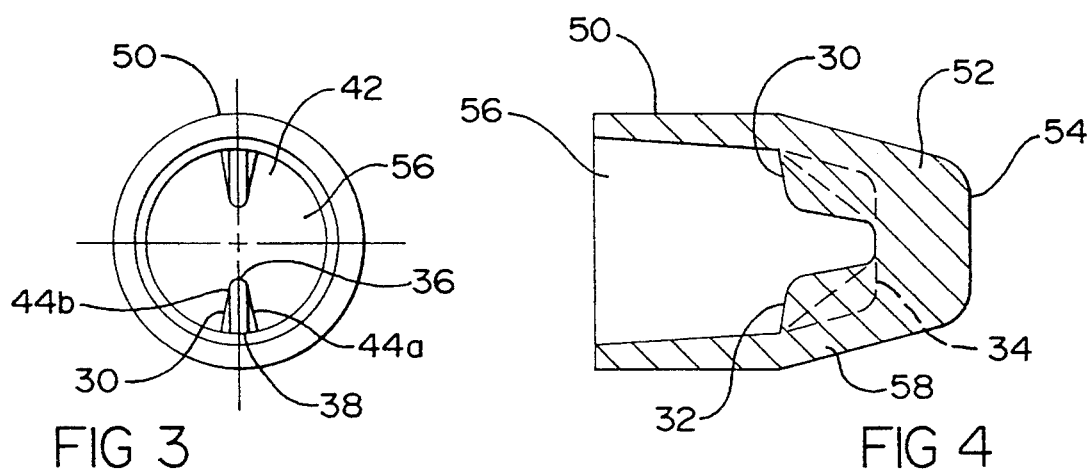
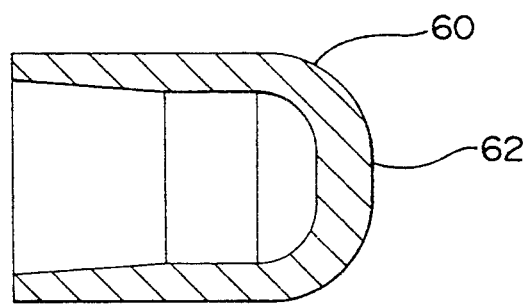

FIG 6
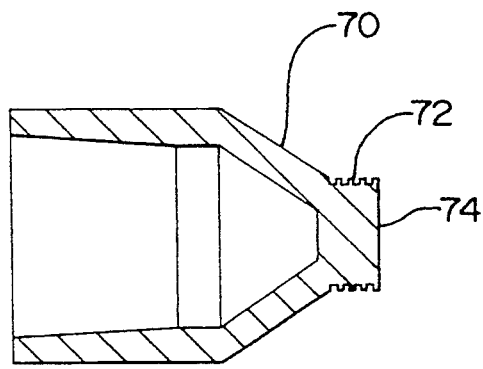
FIG 7
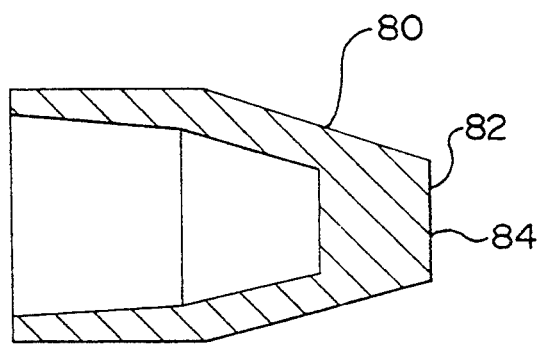
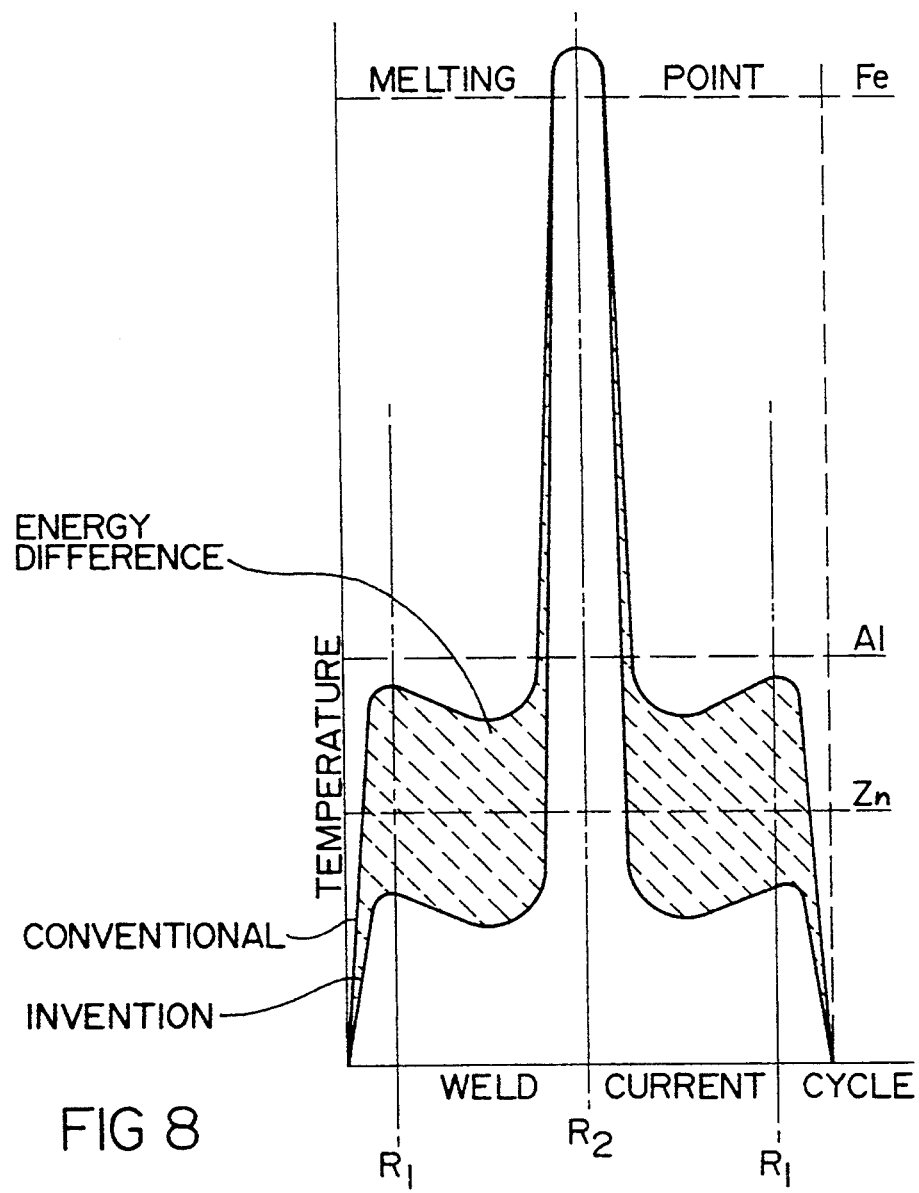
FIG 8

SPOT WELDING ELECTRODE AND METHOD FOR WELDING COATED METALS THEREWITH

BACKGROUND OF THE INVENTION

1. Field of Invention

This invention relates, in general, to resistance spot welding equipment and, more specifically, to resistance spot welding electrodes for coated metals and a method for welding coated metals.

2. Description of Prior Art

Resistance spot welding is a process used to join two or more pieces of metal together by electrically inducing localized fusion of the metal. Usually, the two or more pieces of metal are thin sheets. However, the process has been substantially useful for joining thicker sheets of metal and coated sheets of metal, such as zinc coated metals or galvanized steel.

The spot welding process generally involves clamping the metal pieces or workpieces to be joined together between two axially aligned electrodes and applying high pressure thereto. Then, the two electrodes have a high electrical current passed between them. The electric current, passing between the electrodes, passes through the metal pieces. Any resistance point or location in the path of the current becomes heated. The heat is generated proportionally at each resistance point throughout the circuit in accordance with the formula Q(heat)=$I^2$(current) R (resistance). This process is complex, involving the interaction of electrical, thermal, mechanical, metallurgical, and surface phenomena.

There are generally two types of locations where resistance occurs in the path of the current: (1) at the interface of the electrode and the workpiece and, (2) at the interface of the metal pieces. This is true for all types of resistance spot welding and for all types of metals. When the metal becomes hot at the interface of the metal pieces, they melt, merging together at the localized spot and, upon cooling, form a spot weld or nugget. Great effort is made to keep the electrodes cool during the welding process and therefore keeping the electrode-workpiece interfaces cool and below the melting point of the metal. This prevents the electrode and workpiece from welding together.

There are several factors involved in obtaining an acceptable and quality spot weld: The type of metal to be welded; the type of electrodes to be used; the amount of clamping pressure applied by the electrodes; the amount of electrical current needed to accomplish the weld and the time to accomplish the weld. Of all the above factors, the electrodes have the most impact upon the others. Resistance welding electrodes are normally made of copper alloy and are usually cooled by water. The electrodes serve three essential functions in the welding process: (1) their low electrical resistance provides a conduit to carry a high electrical current to a workpiece without significant heating (Joule) losses; (2) their high thermal conductivity provides a method for conducting heat from the workpiece by controlling the cool-down process, thereby the weld nugget formation; and (3) their concentrated force on the outer surface of the workpieces to be joined properly seats the workpieces to establish a good interface and good electrical contact before electrical current is applied.

However, electrodes generally have a tendency to lose shape (mushroom) during repeated weld cycles. The repeated mechanical pressure cycles can cause mechanical fatigue which leads to electrode distortion. Mushrooming interferes with the ability of the electrode to focus or localize the electric current and interferes with producing a good quality weld. Until the electrode becomes almost useless, adjustments can be made in the other factors to accommodate the electrodes. For example, weld quality can be restored with a current boost, "stepping". A reshaping (dressing) of the electrode to restore the original area at the contact face is usually necessary when all other adjustments fail.

The total electrical resistance of a welding system is identified as the bulk material resistances of the electrode-workpiece interfaces and the surface contact resistance at the interface of the workpieces. These interface resistances are due to surface films, oxides, and asperities. A high electrode pressure, which produces a localized compressive interfacial stress, mechanically breaks down the surface conditions, thereby providing good interfacial electrical and thermal conductance.

The overall resistance of the copper electrodes and the metal to be joined is small. Therefore, a large electrical current is needed to produce a high heating effect in the workpiece. This causes a voltage drop to occur within the workpiece, since the resistivity of the copper electrodes is lower than the metal to be joined. The highest level of heat is therefore at the interface of the workpieces, which produces a temperature distribution to both the workpieces and the electrodes.

If the high current is maintained for a sufficient length of time, localized melting will occur at the interface between the two workpieces and spread to produce the weld nugget. This change from solid to liquid affects a dramatic change in material properties. During the weld cycle, the electrode pressure is maintained to offset the high internal thermal expansion and, thereby, contain the molten pool of metal at the interface of the workpieces. This prevents liquid metal expulsion.

The electrode pressure also helps to maintain proper electrical and thermal contact until the formation of the weld nugget is completed. The weld cycle is terminated by switching the current off while maintaining the electrode pressure. The final stage of this process is the hold cycle, which establishes the metallurgical quality of the weld nugget. During the hold cycle, the nugget cools and contracts. Mechanical pressure is essential to provide the necessary forging pressure to obtain a good metallurgical structure and to prevent the formation of shrinkage voids in the nugget. The hold time is important since it establishes the rate of cooling.

Until the introduction of coated metals, the problems with electrodes were easily resolved by adjusting the other factors and dressing the electrode. However, the use of coated metals, such as galvanized steel, has caused the electrodes to deform faster and/or alloy with the coating.

Alloying occurs when the coating on the metal sticks to the electrode. Zinc (as well as most other coating materials generally) is more electrically conductive than steel. Therefore, the addition of a layer of zinc (or any highly electro-negative coating material) to the workpiece surfaces reduces the overall system contact resistance. This necessitates a corresponding increase in the electrical level of current in order to produce a weld. The result is higher temperatures at the electrode-workpiece interface. These elevated temperatures cause an additional problem when welding coated steels. The coating material has a tendency to alloy with, and stick to, the face of the copper electrodes. The resultant coating "picks up" on the electrode face and, thus, increases its resistance causing further localized heating and accelerated electrode wear as well as a higher incidence of poor quality welds.

The industry has tried to solve the problems by developing creative weld schedules (adjusting the other factors) or creating new electrode alloys. This has resulted in limited success.

Weld schedule manipulation through slope control and multiple-pulse capability have become common methods used on weld controllers to accommodate this procedure. Special heat resistant copper alloys have been developed and used to reduce the tendency of electrodes to soften under high heat conditions. Electrodes of this type are now in common use. They are coupled with high energy weld schedules that establish electrode/steel substrate contact by burning through and/or vaporizing the coating material prior to producing a weld. In all cases, the excessive application of current requires the use of inordinately high levels of energy, and severely compromises the intended function of the protective coating. Quite often the high application of current results in severe expulsion of molten steel from the weld zone with a corresponding deterioration of the structural integrity of the weld, and a negative impact on operator health and safety.

The methods developed to avoid problems associated with the welding of coated metals are generally counter-productive. Several problems still exist for welding coated metals; For example:
(a) coated metals require a high current surge (up-slope) at the beginning of the welding time to melt and break through the resistance of the coating;
(b) up-sloping melts away the coating protection and allows the electrode to penetrate the coating and contact the substrate;
(c) up-sloping increase the alloying of the electrode and the coating;
(d) up-sloping causes the electrode to become hot and to mushroom and deform faster and increase electrode servicing;
(e) all of the above may cause a poor quality weld; and
(f) excessive use of energy.

One example of an electrode to address the coated metal problem is disclosed in U.S. Pat. No. 4,588,870. The invention disclosed therein is an aluminum and copper alloy electrode that has an internal cavity with a portion that partially extends into the tip of the electrode. This partial extension of the cavity apparently provides for additional electrode cooling. The extension, although providing for some additional cooling, does not provide a significant increase in the life of the electrode or a significant energy or cost savings.

Thus, it would be desirable to provide a spot welding electrode and a method of using the electrode for coated metals which has overcome the previous problems, has increased its useful life, and provides a significant energy and cost savings.

SUMMARY OF THE INVENTION

The present invention provides a spot welding electrode that enables welding galvanized and other coated steels with a very minimum, if any, alloying or accumulation of "pick-up" on its workpiece contact face. Further, the present invention provides a method whereby coated steels are spot welded in an environment that does not require the electrode to directly contact the steel surface under the coating of the workpiece as conventional practice suggests. The present electrode is provided with an internal cooling cavity of such configuration as to permit the resistance and heat build up at the contact surfaces to be kept below the critical temperature at which alloying readily occurs.

The spot welding electrode of the present invention is comprised of a cylindrical housing with an open end and a closed end. The housing has a cylindrical cavity formed therein proximate the open end and extending toward the closed end. A wall surrounding the cavity includes an outer surface and an inner surface essentially parallel with the outer surface. The electrode also has means for mounting the electrode to an electrode adaptor.

An electrode contact surface is located on the closed or tip end and is the surface that contacts the metal to be welded. A tip end wall located at the closed end has a thickness ranging from above 0.04 inches to 1.5 inches times the diameter of the contact surface between the contact surface and the opposite inner surface.

A plurality of circumferentially disposed spaced fins or ribs may be integrally formed with the inner surface of the wall. The fins are located in proximity with the closed end of the housing. The fins are formed with a first and second edge and a first and second end. The second edge of the fin is integrated with the inner wall with the first edge partially extending toward the center of the cavity in substantial register with the other fins or ribs.

The second end of each of the fins is integrally formed with the inner wall proximate the closed end and the first end partially extends toward the open end of the housing. Each of the fins have opposing fin walls forming a cooling path therebetween. The inner surface of the wall and the fin walls define the cooling surface of the electrode.

The electrode is proverbial made of highly conductive copper alloy and is substantially cooled during the welding process to reduce the resistance at the electrode-workpiece interface.

The electrode of the present invention provides for a substantially improved method of welding coated metals, which reduces the resistance, therefore the heat, at the electrode-workpiece interface and concentrates the bulk of the heat at the interface of the workpieces.

The method of the present invention for welding coated metals comprises the steps of:
(a) applying a clamping pressure upon at least two coated workpieces with axially opposing heat stabilizing electrodes such that workpieces form to each other to eliminate any air spaces at a welding location of an interface of the workpieces;
(b) applying a cooling liquid into a cavity of an electrode such that the temperature at the electrode-workpiece interface remains stabilized below the melting point of the coating material on the surface of the workpiece during the weld cycle;
(c) applying an electrical current through the electrodes sufficient to create a temperature which, in cooperation with the cooling liquid, is below the melting point of the coating at the interface of the electrode and the associated workpiece but is at least the melting point of the substrate of workpiece at the interface of the workpieces, thereby forming a molten weld nugget at the interface;
(d) discontinuing the electric current while continuing to apply the clamping pressure and the cooling liquid to the electrode to cool the workpiece such that the weld nugget has a balanced cooing and solidification; and (e) thereafter disengaging the clamping pressure from the cooled workpiece.

The electrode is preferably manufactured by a cold forming process. A single tool forms the cavity any the fins disposed within the cavity. The electrode may have different shapes at the tip end, but the preferred electrode is an electrode with an essentially flat tip end.

The various features, advantages and other uses of the present invention will become more apparent by referring to the following detailed description and drawings in which an identical reference number is used to refer to the same component shown in multiple figures of the drawings.

BRIEF DESCRIPTION OF THE DRAWINGS

FIG. 1 is a plan view of a preferred embodiment of the electrode of the present invention;

FIG. 2 is a cross-sectional view of the electrode hereof;

FIG. 3 is a plan view of a second embodiment of the present invention;

FIG. 4 is a cross-sectional view of the second embodiment of the present invention;

FIG. 5 is a cross-sectional view of a third embodiment of the present invention;

FIG. 6 is a cross-sectional view of a fourth embodiment of the present invention;

FIG. 7 is a cross-sectional view of a fifth embodiment of the present invention; and FIG. 8 is a graphical representation of the heat signature of a conventional electrode as well as the electrode of the present invention.

DETAILED DESCRIPTION OF THE INVENTION

At the outset it is to be understood that the term "electrode" as used herein refers to that portion of a spot or resistance welding apparatus which contacts the metal piece(s) under high pressure. An "electrode" is axially aligned with an opposing "electrode" and directs electrical current through the metal pieces in an area corresponding to the contact surface of the two opposed electrodes. The higher resistance at the interface of the two metal pieces between the electrodes causes rapid heating which creates a molten zone at the interface of the metal pieces and between the two electrodes. The molten zone, when cooled, forms a weld spot or nugget which fuses the sheets together.

Referring now to FIGS. 1 and 2, there is depicted a spot-welding electrode 10 of the present invention comprising:

(a) a housing 12, the housing 12 having an open end 14 and a closed end 16, the housing having a cavity 20 formed therein extending from the open end 14 partially toward the closed end 16;

(b) a tip portion 46 having a cooling wall 22 partially surrounding the cavity 20, the wall 22 having an outer surface 24 and an inner surface 26 substantially parallel to the outer surface 24; and (c) a mounting portion 28 integral with the tip portion 46 proximate the open end 14 of the housing 12.

The electrode 10 is, preferably, made from a high conducting copper alloy. The electrode 10 is both an electrical current conductor and a thermal conductor. It has been found that the electrode hereof is particularly efficacious for welding together zinc and zinc-alloy and aluminum alloy-coated steels. The electrode 10 includes a mounting portion 28 which may be tapered, threaded or configured in any other attachment configuration known to the industry to provide for mounting the electrode 10 to a male or female electrode adapter (not shown) which may be part of an individual welding gun or a resistance welding machine. The mounting portion 28 is only indirectly involved in the cooling of the electrode 10.

The inner surface 26 of the cooling wall 22 is essentially parallel to the outer surface 24 of the cooling wall. This provides for the maximum wall surface exposure to any cooling fluid introduced into the cavity 20 of the housing 12.

The surfaces 24 and 26 may be parallel within + or −20% deviation and still provide the desired cooling effect. The parallel surfaces 24 and 26 are essential to prevent any variation in cooling within the wall 22.

The electrode 10 also includes a closed end wall 40 which is located between the inner surface 26 and an electrode contact surface 18 which is located on the outer surface 24 at the closed end 16 of the housing 12. The closed end wall 40 is critical to the cooling performance of the electrode. The inner surface 26 and the contact surface 18 are essentially parallel. Also, the cooling effectiveness of the closed end wall 40 is best accomplished with a wall thickness of from about 0.04 inches to a thickness of about 1.5 times the diameter of the contact surface 18.

The parallel surfaces 18 and 26 alignment and the closed end wall 40 thickness cooperate to provide a cooler electrode 10 a non-alloying contact surface at the electrode-workpiece interface and provide an even distribution of the cooling effect over the entire workpiece-electrode interface.

The electrode 10 and, as shown in FIGS. 1 and 2, has a traditional or standard profile on the outside surface 24. The tip portion 46 of the electrode 10 has a tapered portion which tapers to the contact surface 18. The contact surface 18 has an area of any size desired by the user.

The electrode 10 is, preferably, made from a copper alloy that easily conducts electric current, such that the maximum heat is provided at the metal to metal interface with the minimum of electric current.

As shown in FIGS. 3 and 4, a second embodiment of the electrode 50 includes a plurality of cooling fins 30 or ribs disposed within a cavity 56 of the electrode 50. The fins 30 add overall strength to the closed end wall 52 and the contact surface 54 of the electrode 50. The fins 30 also provide for additional cooling surface when needed. The cooling fins 30 are integrally formed with the cooling wall 58. Each fin 30 has a first edge 36 and second edge 38 and a first end 32 and a second end 34. The second edge 38 of the fins 30 is attached to the cooling wall 58 with the first edge 36 of the fins 30 extending inwardly from the wall 58, partially toward the center of the closed end wall 52 in substantial registry to each other, as shown. The fins 30 define a plurality of cooling paths 42 formed therebetween.

Each fin or rib 30 includes at least two cooling surfaces 44a and 44b which are exposed to any cooling liquid provided to the cavity 56.

As shown in FIG. 5, a third embodiment of the electrode 60 includes a wide body rounded tip end 62 profile. In all other respects the electrode is the same as that shown in FIGS. 1 and 2. Optionally, the fins of the second embodiment may be incorporated therewith.

Likewise, and as shown in FIG. 6, and in a fourth embodiment hereof, the electrode 70 includes a narrow self-dressing tip 72 with a flat or, optionally, slightly radiused contact surface 74 as is disclosed in U.S. Pat. No. 4,476,372 which is hereby incorporated by reference.

In FIG. 7, a fifth embodiment of the electrode 80 is shown as including a conical shaped tip 82 with a small flat or, optionally, slightly radiused contact surface 84.

Each of the embodiments, except for the shape of the tips, essentially have the remaining elements of the first embodiment or the second embodiment if fins 30 are used.

The primary purpose of the present invention is to define an electrode 10 that will substantially cool the interface of the electrode 10 and the workpiece. By cooling the interface, the resistance is substantially reduced.

The workpiece at the electrode-workpiece interface is coated with zinc or other like metal coatings. To produce a quality weld nugget at the interface of two workpieces, the bulk of the heat produced by the electric current must move beyond the electrode-workpiece interface ($R^1$), as demonstrated in FIG. 8, without melting the coating and be focused at the interface of the workpieces ($R^2$). Conventionally, this is accomplished by introducing a surge in current at the beginning of the welding cycle that melts the coating (Zn) away from the surface of the workpiece at the electrode-workpiece interface so that direct steel to electrode contact is made. This process usually requires a recoating of the interface location or rust will occur.

By substantially cooling the electrode-workpiece interface, the coating usually remains intact. This eliminates the need for a large electric current surge at the beginning of the weld cycle. The difference between the conventional method and the method of the invention is clearly demonstrated by current chart shown in FIG. 9. Because of the low resistance $R^1$ at the cooled electrode-workpiece interface the electric current more easily moves through interface to the higher resistance ($R^2$) at the interface of the two workpieces. Also, because no large surge of electric current is required at the beginning of the weld cycle, the current is easier to control and less energy is used to reach the workpiece melting point (Fe). The differential in energy is represented by the area under the curves.

The electrode 10 of the present invention permits the use of a substantially improved method for welding coated metals. The method comprises the steps of:

(a) applying a clamping pressure to at least a pair of coated workpieces with axially opposing heat stabilizing electrodes, such that the workpieces form to each other to eliminate any air spaces at a welding location at the interface of the workpieces;

(b) applying a cooling liquid into a cavity of an electrode such that the temperature at the electrode-workpiece interface remains stabilized below the melting point of the coating material on the surface of the workpieces during the weld cycle;

(c) applying an electrical current to the workpieces through the electrodes over the time of the weld cycle below the melting point of the coating sufficient to create a temperature which, in cooperation with the cooling liquid is at the interface of the electrode and the associated workpiece but is at least the melting point of the substrate of the workpiece at the interface of the workpieces whose resistance increases proportionally as a function of its temperature thereby to form a molten weld nugget at the interface;

(d) discontinuing the electric current while continuing to apply the clamping pressure and the cooling liquid to the electrodes to cool the workpiece such that the weld nugget has a balanced cooling and solidification; and (e) thereafter, disengaging the clamping pressure from the cooled workpieces.

The ability to control the temperature gradient differential between the electrode-workpiece interface ($R^1$) and the interface of the workpieces ($R^2$) in the manner described above provides a concentration of heat at interface of the workpieces ($R^2$) such that a weld nugget is grown from the inside out without displacing coating material and with only a minimum heat signature on the exterior surface.

By controlling interfacial resistance, current flow is induced to "look through" the electrode/workpiece interface to the interface of the workpieces. This has the effect of concentrating the electrical energy at the center of the workpieces and "welding from the inside out" with a minimum heat signature on the outside coated surfaces. High quality welds are produced on a continuous basis with little or no expulsion of the parent metal, without melting through, vaporizing, perforating, or otherwise displacing the coating material at the electrode-workpiece interface. The electrode of the present invention and method of use provide longer electrode life, enhanced energy utilization, operator health and safety, easier weld system maintenance, and better manufacturing productivity.

In summary, there has been disclosed a unique spot welding electrode having a more efficient inner cooling surface which enables temperature management such that the coating on the workpieces remains intact between the electrode and the workpiece, while enabling the workpieces themselves to be welded. Hence, little or no alloying occurs between the electrode and the workpiece. Thus, the method hereof utilizes the substantially significant cooling characteristics of the electrodes to preserve the coating on the welded metal and shift the concentration of heat to the workpiece interface, uses less energy and extends the life of the electrode.

Having, thus, described the invention, what is claimed is:

1. A spot welding electrode comprising:
    (a) a housing having an open end and a closed end the housing having a cavity formed therein partially extending from the open end toward the closed end;
    (b) a mounting portion for mounting to an electrode adaptor, the mounting portion being disposed proximate the open end of the housing;
    (c) a tip portion, the tip portion being integral with the mounting portion and being disposed proximate the closed end of the housing, the tip portion having a cooling wall and an integral end wall surrounding and defining the cavity within the tip portion, the tip portion having an outer surface and an inner surface, the inner surface being substantially parallel to the outer surface; and wherein the cavity, the cooling wall, the end wall and the parallel surfaces of the tip portion cooperate to define a non-alloying contact surface.

2. The spot welding electrode of claim 1 wherein the mounting portion is tapered.

3. The spot welding electrode of claim 1 wherein the electrode is made of a highly conductive copper alloy.

4. The spot welding electrode of claim 1, which further comprises: a plurality of cooling fins disposed within the cavity and integrally formed with the wall, the fins having a first and second edge and a first end and a second end, the second edge of the fins attached to the wall and the first edge of the fins extending partially inward toward a center of the closed end of the housing in substantial registry to each other, the fins having a plurality of cooling paths formed therebetween.

5. The spot welding electrode of claim 1 further comprising:

a tapered tip portion proximate the closed end of the housing, the tip portion having a contact surface located on the outer surface at the closed end, the tip portion having a closed end wall disposed between the contact surface and the inner wall of the housing, the contact surface and the inner wall being essentially parallel.

6. The spot welding electrode of claim 5 wherein the closed end wall has a thickness from about a minimum of 0.04 inches to about 1.5 times the diameter of the contact surface.

7. A spot welding electrode comprising:
(a) a housing having an open end and a closed end, the housing having a cavity formed therein extending from the open end partially toward the closed end;
(b) a mounting portion for mounting to an electrode adaptor, the mounting portion being disposed proximate the open end of the housing;
(c) a tip portion, the tip portion integral the mounting portion and being disposed proximate the closed end of the housing, the tip portion having a cooling wall and an integral end wall surrounding and defining the cavity within the tip portion, the tip portion having an outer surface and an inner surface, the inner surface being substantially parallel to the outer surface;
(d) a plurality of cooling fins disposed within the cavity and integrally formed with the wall, the fins having a first and second edge and a first end and a second end, the second edge of the fins extending partially inward toward the center of the closed end of the housing, the spaces between the fins defining a plurality of cooling paths; and wherein the cavity, the tip portion, the cooling fins and the parallel surfaces of the cooling wall and end wall cooperate to define a non-alloying contact surface.

8. The electrode of claim 7 wherein each fin includes opposed cooling surfaces substantially parallel to each other, each of the cooling surfaces defining a cooling path for a coolant.

9. The electrode of claim 8 wherein the electrode is made of a copper alloy.

10. A method of welding comprising the steps of:
(a) applying a clamping pressure upon at least two coated metal workpieces with axially opposing heat stabilizing electrode workpieces formed to each other to eliminate any air spaces at a welding location at the interface of the workpieces;
(b) applying a cooling liquid into the cavity of at least one of the electrodes such that the temperature at the electrode-workpiece interface remains stabilized below the melting point of the coating material on the surface of the workpieces during the weld cycle;
(c) applying an electrical current to the workpieces through the electrodes sufficient to create a temperature which, in cooperation with the cooling liquid, is below the melting point of the coating at the interface of the electrode and the associated workpiece and which is at at least the melting point of the substrate of the workpiece at the interface of the workpieces, to form a molten weld nugget at the weld location at the interface of the workpieces;
(d) discontinuing the electric current and continuing to apply the clamping pressure and the cooling liquid to the electrodes such that the weld nugget has a balanced cooling and solidification;
(e) disengaging the clamping pressure from the cooled workpieces, and wherein, the cooling liquid and the at least one electrode cooperate to prevent the alloying of the coating material to the electrode during the application of electrical current and the forming of the weld nugget.

11. The method of claim 10 wherein each electrode is the electrode of claim 1.

12. The method of claim 11 wherein each electrode further comprises:

a plurality of circumferentially spaced apart cooling fins disposed within the cavity and integrally formed with the wall, each fin having a first edge and a second edge of each fin being attached to the wall and the first edges extending inwardly toward the center of the closed end, the spaces between the fins defining cooling paths for a coolant.

* * * * *

(12) EX PARTE REEXAMINATION CERTIFICATE (9715th)
United States Patent
Prucher

(10) Number: US 5,349,153 C1
(45) Certificate Issued: Jun. 26, 2013

(54) SPOT WELDING ELECTRODE AND METHOD FOR WELDING COATED METALS THEREWITH

(76) Inventor: Bryan Prucher, Clarkston, MI (US)

Reexamination Request:
No. 90/010,912, Mar. 12, 2010

Reexamination Certificate for:
Patent No.: 5,349,153
Issued: Sep. 20, 1994
Appl. No.: 07/952,051
Filed: Sep. 28, 1992

(51) Int. Cl.
*B23K 11/11* (2006.01)
*B23K 11/30* (2006.01)

(52) U.S. Cl.
USPC ........................................ 219/120; 219/117.1

(58) Field of Classification Search
None
See application file for complete search history.

(56) References Cited

To view the complete listing of prior art documents cited during the proceeding for Reexamination Control Number 90/010,912, please refer to the USPTO's public Patent Application Information Retrieval (PAIR) system under the Display References tab.

*Primary Examiner* — William C. Doerrler

(57) ABSTRACT

A spot welding electrode designed for welding coated metals such as galvanized steel and a method of welding coated metals using the spot welding electrode. The electrode includes a housing having a hollow cavity with an open end and a closed end. The cavity is surrounded by a cooling wall which has an outer surface and a parallel inner surface. The parallel surfaces provide a substantially improved and consistent cooling method for maintaining temperature at the electrode-workpiece interface below the melting point of the coating. The bulk of the heating during the weld cycle is focused at the interface of the workpiece.

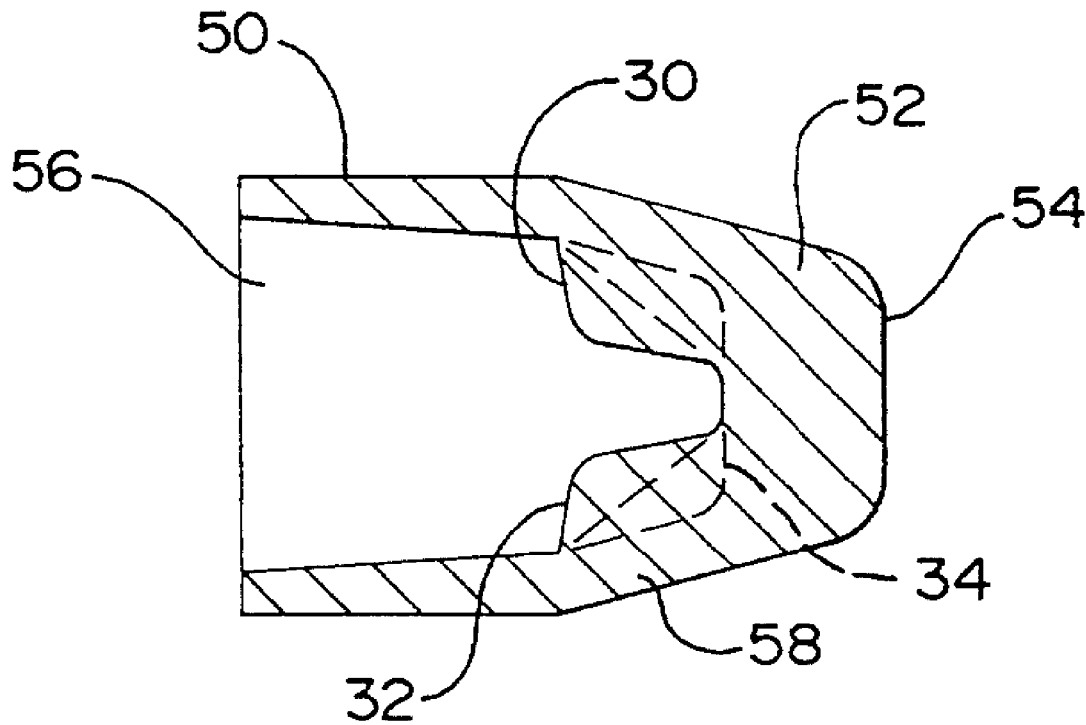

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*